No. 686,178.  Patented Nov. 5, 1901.
R. F. WILSON.
REVERSING GEAR.
(Application filed July 15, 1901.)
(No Model.) 2 Sheets—Sheet 1.
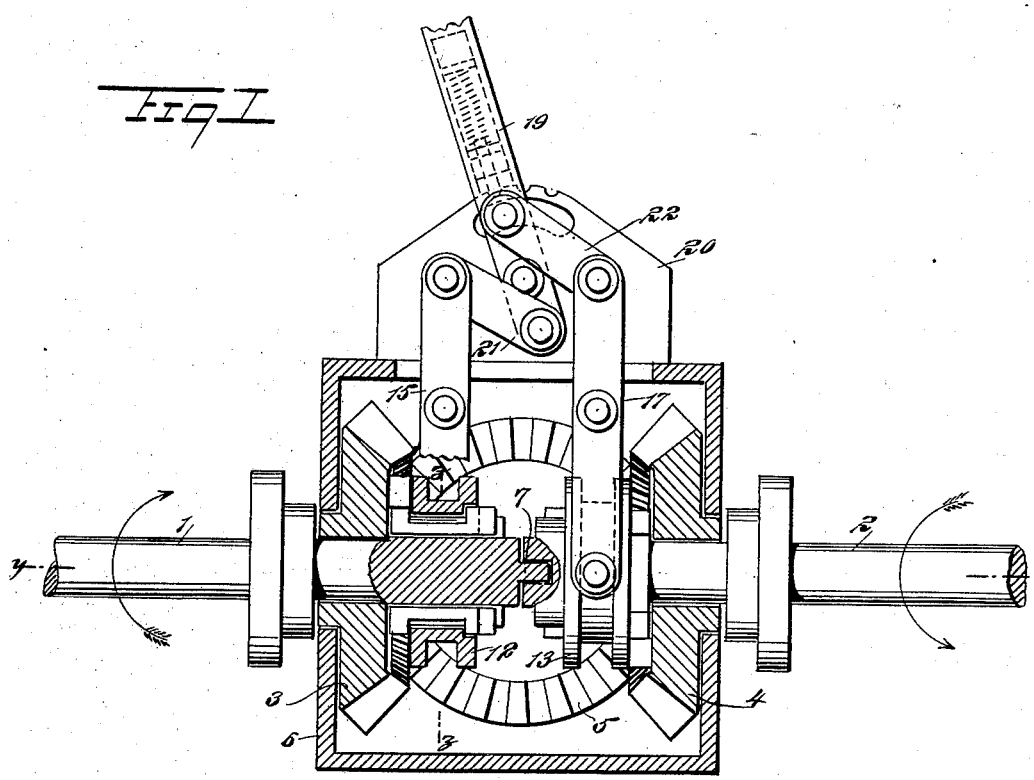
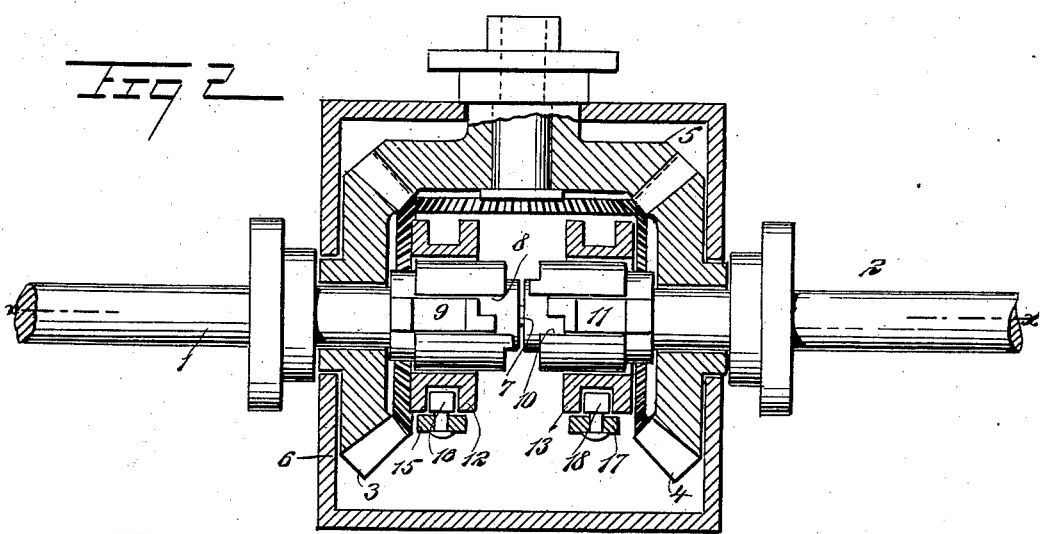
WITNESSES:
H Walker
C. R. Ferguson
INVENTOR
Richard F. Wilson.
BY
ATTORNEYS
THE NORRIS PETERS CO., PHOTO-LITHO., WASHINGTON, D. C.

No. 686,178. Patented Nov. 5, 1901.
R. F. WILSON.
REVERSING GEAR.
(Application filed July 15, 1901.)
(No Model.) 2 Sheets—Sheet 2.
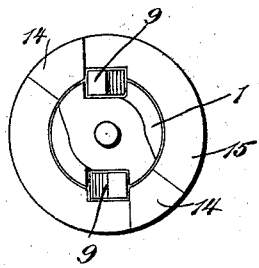
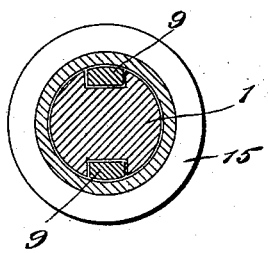
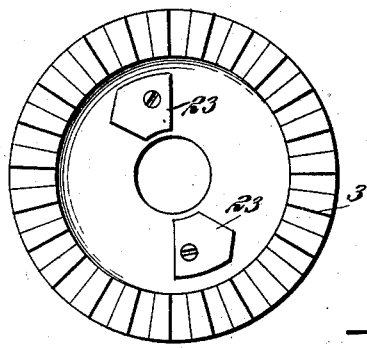
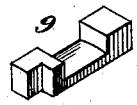
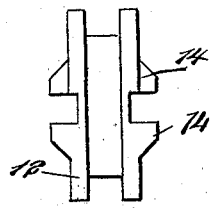
WITNESSES:
H. Walker
C. R. Ferguson
INVENTOR
Richard F. Wilson.
BY
ATTORNEYS
THE NORRIS PETERS CO., PHOTO-LITHO., WASHINGTON, D. C.

UNITED STATES PATENT OFFICE.

RICHARD F. WILSON, OF ALBANY, NEW YORK.

REVERSING-GEAR.

SPECIFICATION forming part of Letters Patent No. 686,178, dated November 5, 1901.

Application filed July 15, 1901. Serial No. 68,343. (No model.)

*To all whom it may concern:*

Be it known that I, RICHARD F. WILSON, a citizen of the United States, and a resident of Albany, in the county of Albany and State of New York, have invented a new and Improved Reversing-Gear, of which the following is a full, clear, and exact description.

This invention relates to improvements in reversing-gear for use in connection with combustion-engines or other engines or motors where the shaft is at all times rotated in one direction, the device being particularly adapted for the shafting of propellers for naphtha-launches or the like; and the object is to provide a reversing-gear of simple construction by means of which the direction of rotation of the driven shaft or propeller may be quickly changed or rendered inoperative.

I will describe a reversing-gear embodying my invention and then point out the novel features in the appended claims.

Reference is to be had to the accompanying drawings, forming a part of this specification, in which similar characters of reference indicate corresponding parts in all the views.

Figure 1 is a section on the line $x\ x$ of Fig. 2 of a reversing-gear embodying my invention. Fig. 2 is a section on the line $y\ y$ of Fig. 1. Fig. 3 is an end view of one of the shafts and showing clutch mechanism. Fig. 4 is a section on the line $z\ z$ of Fig. 1. Fig. 5 is an inner face view of one of the driving-gears. Fig. 6 is a perspective view of one of the clutch-blocks embodied in the invention, and Fig. 7 is an edge view of one of the shifting rings employed.

Referring to the drawings, 1 designates the driving-shaft, operated by a combustion-engine or the like, and 2 is the driven shaft, which when the device is used for the propulsion of a vessel will have the propeller attached to it. Loosely mounted on the shaft 1 is a bevel-gear 3, and loosely mounted on the shaft 2 is a bevel-gear 4, these bevel-gears 3 and 4 meshing with an idler bevel-gear 5. The several gears, as here shown, are arranged within a boxing or casing 6. One of the shafts, here shown as the shaft 1, has at its end within the casing 6 a spur 7, designed to engage in an opening in the end of the other shaft, which will have a tendency to prevent lateral vibrating motion of the shafts.

At its end within the casing 6 the shaft 1 is provided with longitudinal opposite channels 8, in which clutch-blocks 9 are movable. The inner end of the shaft 2 is also provided with opposite longitudinal channels 10, in which clutch-blocks 11 are movable. Near its end each clutch-block is provided with portions which project outward beyond the periphery of the shaft, and between these projected portions shifting rings are designed to engage. For engaging with the blocks 9 is a shifting ring 12, and for engaging with the blocks 11 is a shifting ring 13. The inner ends of opposite blocks 9 and 11 are designed to interlock, and therefore I have shown the blocks at their inner ends cut away for one-half their thickness or width, and to relieve the pressure somewhat upon the interlocking blocks I provide the inner and adjacent faces of the rings 12 and 13 with lugs 14, the lugs of one ring being adapted to engage with the lugs of the other ring. A lever 15 supports at its lower end a friction-roller 16, which engages in an annular channel formed in the ring 12, and a lever 17 has a roller 18 at its lower end for engaging in an annular channel formed in the ring 13. A shifting lever 19 is pivoted to an upward extension 20 on the casing 6, and a link 21 connects the upper end of the lever 15 with the lower end of the lever 19, below the pivotal point of said lever 19, while a link 22 connects the upper end of the lever 17 with the shifting lever 19 at a point above the pivot of said shifting lever. By this means when the shifting lever is moved the clutch-blocks with the rings will be simultaneously moved in opposite directions. The inner faces of the gears 3 and 4 are provided with opposite blocks 23, which are designed to be engaged by the outer ends of the clutch-blocks 9 and 11. Therefore these blocks 23 may be termed "clutch-sections."

In operation when the parts are in the position indicated in Fig. 1, the clutch-blocks being in engagement with the clutch-blocks on the gears, motion imparted to the motor-shaft 1 in the direction indicated by the arrow will of course impart a corresponding rotary motion to the gear 3. This gear 3 rotating the gear 5 will cause a reverse rotary motion of the gear 4, and consequently a reverse motion of its shaft. Should it be desired to rotate the shaft 2 in the reverse direction or in the direction of rotation of the driving or motor shaft, the shifting lever 19 is to be thrown in the opposite direction or to the opposite side of the center, when the inner or adjacent ends of opposite clutch-blocks 9 and 11 will come into engagement, thus rotating the two shafts together without imparting motion to the gear-wheels. Should it be desired to stop the propeller, the driving-shaft 1 being in motion, the shifting lever 19 is to be moved to a central or vertical position, which will separate or move the opposite clutch-blocks sufficiently far apart so that the blocks carried by the shaft 1 may pass the blocks mounted on the shaft 2. The shifting lever may be held in place by means of a spring-pressed bolt or support engaging with a rack on the upper end of the part 20.

Having thus described my invention, I claim as new and desire to secure by Letters Patent—

1. In a reversing-gear, a driving-shaft and a driven shaft, bevel-gears loosely mounted on said shafts, an idler-gear meshing with said two bevel-gears, clutch-blocks movable on the two shafts, clutch members on the bevel-gears for engaging the said clutch-blocks, whereby the shafts are driven in opposite directions, and means for moving the inner or adjacent ends of opposite clutch-blocks into engagement, whereby both shafts will be driven in the same direction.

2. A reversing-gear, comprising a driving-shaft and a driven shaft, bevel-gears loosely mounted on said shafts, an idler bevel-gear meshing with the first-named bevel-gears, each of said shafts having opposite longitudinal channels, clutch-blocks movable in the channels of the driving-shaft, clutch-blocks movable in the channels of the driven shaft, clutch members on the first-named bevel-gears for engaging with the clutch-blocks, shifting rings engaging the clutch-blocks of the shafts, levers having portions extended into the annular channels formed in the rings, a shifting lever, and link connections between said shifting lever and the first-named lever, one link having its connection above the pivotal point of the shifting lever and the other link having its connection below the pivot-point of the shifting lever.

3. A reversing-gear, comprising a driving-shaft, a driven shaft, bevel-gears loosely mounted on said shafts, a clutch device carried by the two shafts and movable longitudinally thereof, means for moving the clutch devices into locking engagement with opposite bevel-gears, means for moving the inner or adjacent ends of opposite blocks into engagement, and means for holding the blocks of one shaft out of engagement with the blocks of the other shaft, whereby the driving-shaft may rotate while the driven shaft remains stationary, and an idler-gear meshing with the first two gears.

In testimony whereof I have signed my name to this specification in the presence of two subscribing witnesses.

RICHARD F. WILSON.

Witnesses:
CHARLES A. HOLLENBECK,
JOSEPH A. FRANKLIN.